(12) United States Patent
Ramirez Corredores et al.

(10) Patent No.: US 9,327,208 B2
(45) Date of Patent: May 3, 2016

(54) BIO-OIL FRACTIONATION

(75) Inventors: Maria Magdalena Ramirez Corredores, Houston, TX (US); Xiaowei Tong, Houston, TX (US); Jennifer Sorrells, Houston, TX (US); Jeffrey R. Anderson, Edmond, OK (US)

(73) Assignee: KiOR, LLC, Pasadena, TX (US)

( * ) Notice: Subject to any disclaimer, the term of this patent is extended or adjusted under 35 U.S.C. 154(b) by 850 days.

(21) Appl. No.: 13/459,887

(22) Filed: Apr. 30, 2012

(65) Prior Publication Data

US 2013/0284579 A1    Oct. 31, 2013

(51) Int. Cl.
| | |
|---|---|
| C10B 53/02 | (2006.01) |
| C10B 49/22 | (2006.01) |
| B01D 1/22 | (2006.01) |
| B01D 3/12 | (2006.01) |
| B01D 3/00 | (2006.01) |
| C10B 57/06 | (2006.01) |
| C10G 7/04 | (2006.01) |
| C10G 7/06 | (2006.01) |
| B01D 5/00 | (2006.01) |

(52) U.S. Cl.
CPC ............... *B01D 1/225* (2013.01); *B01D 3/009* (2013.01); *B01D 3/12* (2013.01); *B01D 5/006* (2013.01); *C10B 53/02* (2013.01); *C10B 57/06* (2013.01); *C10G 7/04* (2013.01); *C10G 7/06* (2013.01); *C10G 2300/203* (2013.01); *C10G 2300/301* (2013.01); *Y02E 50/14* (2013.01); *Y02P 20/145* (2015.11); *Y02P 30/20* (2015.11)

(58) Field of Classification Search
CPC ........ C10B 53/02; C10B 49/22; C10B 57/06; B01D 3/12; B01D 3/009; B01D 5/006
USPC ............ 201/2.5; 202/205; 203/75, 77, 81–82; 585/240, 242; 44/605–606
See application file for complete search history.

(56) References Cited

U.S. PATENT DOCUMENTS

| | | | |
|---|---|---|---|
| 4,209,647 A | 6/1980 | Gallivan et al. | |
| 4,366,049 A * | 12/1982 | Knorre et al. | 208/179 |
| 4,942,269 A | 7/1990 | Chum et al. | |
| 5,374,348 A * | 12/1994 | Sears et al. | 208/107 |
| 6,844,420 B1 | 1/2005 | Freel et al. | |
| 7,959,765 B2 | 6/2011 | Argyropoulos | |
| 8,100,990 B2 | 1/2012 | Ellens et al. | |
| 2005/0177013 A1 * | 8/2005 | Countz | 585/240 |
| 2007/0175793 A1 | 8/2007 | Narine et al. | |
| 2009/0054711 A1 | 2/2009 | Lawrence et al. | |

(Continued)

FOREIGN PATENT DOCUMENTS

| | | | |
|---|---|---|---|
| WO | WO 2010050901 A1 * | 5/2010 | C10M 175/00 |
| WO | WO2012/027372 | 3/2012 | |

OTHER PUBLICATIONS

Oasmaa, Anja, et al. "Properties and Fuel Use of Biomass-Derived Fast Pyrolysis Liquids. A Guide" VTT Publications 731. (2010): 46.*

(Continued)

*Primary Examiner* — Renee E Robinson
*Assistant Examiner* — Jonathan Miller
(74) *Attorney, Agent, or Firm* — Dunlap Codding, P.C.

(57) ABSTRACT

Disclosed is a process/system for the fractionation of bio-oil, produced from the thermo-catalytic conversion of biomass, into boiling point fractions. The fractionation of the bio-oil is performed using molecular distillation under conditions which minimize the thermal stress to the bio-oil and fractions obtained therefrom.

35 Claims, 6 Drawing Sheets

(56) References Cited

U.S. PATENT DOCUMENTS

| | | | |
|---|---|---|---|
| 2009/0165378 A1 | 7/2009 | Agblevor | |
| 2009/0227823 A1* | 9/2009 | Huber et al. | 585/324 |
| 2009/0301930 A1* | 12/2009 | Brandvold et al. | 208/17 |
| 2010/0063332 A1 | 3/2010 | Chang | |
| 2011/0192075 A1 | 8/2011 | Kale | |
| 2012/0101318 A1* | 4/2012 | Ramirez Corredores et al. | 585/240 |
| 2012/0204481 A1* | 8/2012 | Corredores et al. | 44/385 |

OTHER PUBLICATIONS

Wang, et al., Separation of Bio-Oil by Molecular Distillation; Fuel Processing Technology; Feb. 10, 2009; pp. 738-745.

Guo, et al., Separation Characteristics of Biomass Pyrolysis Oil in Molecular Distillation; Separation and Purification Technology; Sep. 15, 2010; pp. 52-57.

Guo, et al., Upgrading of Bio-Oil Molecular Distillation Fraction With Solid Acid Catalyst; BioResources; May 13, 2011; pp. 2539-2550.

Guo, et al. Pyrolysis Characteristics of Bio-Oil Fractions Separated by Molecular Distillation; Applied Energy; Oct. 31, 2009; pp. 2892-2898.

Guo, et al.; Separation of Acid Compounds for Refining Biomass Pyrolysis Oil; Journal of Fuel Chemistry and Technology; Nov. 16, 2008; pp. 49-52.

International Search Report for PCT Application No. PCT/US2013/035276; filed on Apr. 4, 2013; dated Jul. 5, 2013; 4 pages.

* cited by examiner

BIO-OIL FRACTIONATION

FIELD OF THE INVENTION

The present invention relates generally to processes and systems for fractionating a bio-oil into boiling point fractions. More specifically, the invention relates to fractionation of bio-oil by molecular distillation without subjecting the bio-oil to prolonged thermal stress.

DESCRIPTION OF THE RELATED ART

With the rising costs and environmental concerns associated with fossil fuels, renewable energy sources have become increasingly important, and in particular, the production of renewable transportation fuels from the conversion of biomass feedstocks. Many different processes have been, and are being, explored for the conversion of biomass to biofuels and/or specialty chemicals. Some of the existing biomass conversion processes include, for example, combustion, gasification, slow pyrolysis, fast pyrolysis, liquefaction, and enzymatic conversion. The conversion products produced from these processes tend to be of low quality, containing high amounts of water and highly oxygenated hydrocarbonaceous compounds, making them difficult to separate into aqueous and hydrocarbonaceous phases. Also, these products usually require extensive secondary upgrading in order to be useful as transportation fuels. Bio-oils produced from the thermo-catalytic conversion of biomass tend to be of better quality, with hydrocarbonaceous compounds having relatively low oxygen content, and which are generally separable by gravity separation into aqueous and hydrocarbonaceous phases. However, each of the above described bio-oils still suffer from thermal instability, making it difficult to fractionate into various boiling point fractions.

Typical distillation techniques, including conventional vacuum distillation, tend to thermally stress the bio-oil, altering the character of the bio-oil, and resulting in lower than desired and lower than expected yields of light and middle distillate fractions, and an undesirable increase in the heavy fractions.

Accordingly, there remains a need for an improved process and system for fractionating a bio-oil, and in particular, a thermo-catalytically derived bio-oil, in such a manner so as to maximize the yield of light and middle distillate range fractions.

SUMMARY OF THE INVENTION

In accordance with an embodiment of the present invention, a method for producing a bio-oil distillated fraction is provided comprising:

a) converting biomass in a conversion reactor to thereby produce a conversion reactor effluent comprising vapor conversion products, wherein the conversion reactor contains a catalyst and is operated at a temperature in the range of from about 200° C. to about 1000° C.;

b) condensing at least a portion of the vapor conversion products to form a condensate comprising bio-oil and water; and c) fractionating a feed comprising at least a portion of the condensate by molecular distillation to form the bio-oil distillated fraction.

In accordance with another embodiment of the present invention, following step b) above, the condensate can be separated by gravity separation into a bio-oil stream comprising the bio-oil and less than about 10 wt % water, and into an aqueous phase comprising water and less than about 25 wt % hydrocarbonaceous compounds; and the bio-oil stream can be used as at least a portion of the feed.

In accordance with another embodiment of the present invention, a method for fractionating the feed by molecular distillation in step c is provided comprising:

i) allowing the feed to form into a thin layer onto an evaporating surface;

ii) evaporating a portion of the feed to thereby form a bio-oil vapor fraction and a bio-oil liquid residue;

iii) condensing at least a portion of the bio-oil vapor fraction at a location in close proximity to the location of the evaporation in step ii) to thereby form the bio-oil distillated fraction;

iv) collecting the bio-oil distillated fraction; and v) collecting the bio-oil liquid residue, thereby forming a collected bio-oil liquid residue.

DETAILED DESCRIPTION OF THE INVENTION

The biomass material useful in the current invention can be any biomass capable of being converted to liquid and gaseous hydrocarbons.

Preferred are solid biomass materials comprising a cellulosic material, in particular lignocellulosic materials, because of the abundant availability of such materials, and their low cost. The solid biomass feed can comprise components selected from the group consisting of lignin, cellulose, hemicelluloses, and combinations thereof. Examples of suitable solid biomass materials include forestry wastes, such as wood chips and saw dust; agricultural waste, such as straw, corn stover, sugar cane bagasse, municipal waste, in particular yard waste, paper, and card board; energy crops such as switch grass, coppice, eucalyptus; and aquatic materials such as algae; and the like.

The biomass can be thermo-catalytically converted at elevated temperatures. In particular, the biomass can be converted in a conversion reactor containing a catalyst to thereby produce a conversion reactor effluent comprising vapor conversion products and catalyst. The conversion reactor effluent can also include unreacted biomass, coke, or char. The vapor conversion products comprise, consist of, or consist essentially of bio-oil and water. The conversion reactor can be operated at a temperature in the range of from about 200° C. to about 1000° C., or between about 250° C. and about 800° C. The conversion reactor can also be operated in the substantial absence of oxygen.

The catalyst can be any catalyst capable of converting biomass to a bio-oil product having relatively low oxygen levels. The oxygen levels of such bio-oil can be less than about 20 wt % on a dry basis, or between about 4 to about 18 wt % on a dry basis.

More particularly, useful catalysts for the current invention include those containing catalytic acidity and preferably containing a zeolite. Examples of suitable zeolites include ZSM-5, mordenite, beta, ferrierite, and zeolite-Y. Additionally, the catalyst may comprise a super acid, including sulfonated, phosphated, or fluorinated forms of zirconia, titania, alumina, silica-alumina, and/or clays. In another embodiment, the catalyst may comprise a solid base including metal oxides, metal hydroxides, and/or metal carbonates. In particular, the oxides, hydroxides, and carbonates of alkali metals, alkaline earth metals, transition metals, and/or rare earth metals are suitable. Other suitable solid bases are layered double hydroxides, mixed metal oxides, hydrotalcite, clays, and/or combinations thereof. In yet another embodiment, the catalyst can also comprise an alumina, such as alpha-alumina.

At least a portion of the vapor conversion products can be separated from the conversion reactor effluent, and at least a portion of the vapor conversion products thus separated can be condensed to form a condensate comprising bio-oil and water. The condensate is generally separable by gravity separation into the bio-oil and into an aqueous phase comprising water.

Optionally, at least a portion of the bio-oil can be separated from the condensate, also forming the aqueous phase comprising water and less than about 25 wt %, or less than about 15 wt % hydrocarbonaceous compounds. The thus separated bio-oil has a total oxygen content of less than about 20 wt %; comprises at least about 10 wt % hydrocarbons, has a Total Acid Number of less than about 50 mgKOH/g, has a Conradson Carbon Residue of less than about 30 wt %, contains less than or equal to about 10 wt % carbonyl compounds, and contains less than about 10 wt %, or less than about 8 wt % water. Such separation can be by any method capable of separating bio-oil from an aqueous phase, and can include, but is not limited to, centrifugation, membrane separation, gravity separation, and the like. Preferably, if separated, the condensate is separated by gravity separation in a settling vessel into the bio-oil and into the aqueous phase.

A feed comprising either or both of: 1) at least a portion of the condensate, or 2) at least a portion of the bio-oil, if such is optionally separated from the condensate as described above, can be fractionated by molecular distillation to form a bio-oil distillated fraction.

Such molecular distillation can comprise, consist of, or consist essentially of:

i) allowing a feed comprising, consisting of, or consisting essentially of either the condensate or the bio-oil to form into a thin layer onto an evaporating surface;

ii) evaporating a portion of the feed to thereby form a bio-oil vapor fraction and a bio-oil liquid residue;

iii) condensing at least a portion of the bio-oil vapor fraction at a location in close proximity to the location of the evaporation in step ii) to thereby form the bio-oil distillated fraction;

iv) collecting the bio-oil distillated fraction; and v) collecting the bio-oil liquid residue, thereby forming a collected bio-oil liquid residue.

The evaporation of the feed in step ii) can be conducted at a temperature in the range of from about 20° C. to about 120° C., or from about 30 to about 100° C. The bio-oil vapor fraction can be condensed in step iii) at a temperature below about 20° C., or below about 10° C., or below about 4° C.

The fractionation by molecular distillation can be conducted at a pressure below about 200 torr, or below about 100 torr.

The bio-oil distillated fraction can comprise, consist of, or consist essentially of water and a light bio-naphtha. If it is the bio-oil which is subjected to the molecular distillation described above, then the resulting bio-oil distillated fraction can comprise less than about 50 wt % water. The bio-oil distillated fraction, however acquired, can be separated to form an aqueous distillate fraction comprising water and to form such light bio-naphtha having a density less than about 0.89, a TAN less than about 5, and comprising less than about 1 wt % water.

The light bio-naphtha has a boiling point range of from about 25° C. to about 220° C., or from about 30° C. to about 190° C.; and an oxygenate compounds/hydrocarbons wt. ratio below about 2 and/or at least about 0.01, or below about 1 and/or at least about 0.05.

At least a portion of the collected bio-oil liquid residue can be recycled to become a part of the feed in a continuous process.

In accordance with another embodiment, the collected bio-oil liquid residue can be fractionated by molecular distillation by a method comprising:

vi) allowing the collected bio-oil liquid residue to form into a thin layer onto an evaporating surface;

vii) evaporating a portion of the collected bio-oil liquid residue to thereby form a second pass bio-oil vapor fraction and a second pass bio-oil liquid residue;

viii) condensing at least a portion of the second pass bio-oil vapor fraction at a location in close proximity to the location of the evaporation in step vii) to thereby form a second pass bio-oil distillated fraction;

ix) collecting the second pass bio-oil distillated fraction; and x) collecting the second pass bio-oil liquid residue, thereby forming a collected second pass bio-oil liquid residue.

The evaporation of the collected bio-oil liquid residue in step vii) can be conducted at a temperature in the range of from about 50° C. to about 200° C., or from about 60 to about 150° C. The condensation of the second pass bio-oil vapor fraction can be conducted at a temperature below about 20° C., or below about 10° C., or below about 4° C.

The fractionation of the collected bio-oil liquid residue by molecular distillation can be conducted at a pressure below about 100 torr, or below about 80 torr.

The second pass bio-oil distillated fraction has a boiling point range of from about 30° C. to about 250° C., or from about 40° C. to about 230° C.; an oxygenate compounds/hydrocarbons ratio below about 3 and/or at least about 0.2, or below about 2 and/or at least about 0.4; a density below about 0.96, and a TAN below about 10.

In accordance with an embodiment of the present invention, the fractionations by molecular distillation described above of: A) the feed in steps i)-v) and B) the collected bio-oil liquid residue in steps vi)-x), can each separately and sequentially be performed in a single molecular distillation apparatus. Such molecular distillation apparatus can be in accordance with the apparatus depicted in FIG. 1, and described below.

Figure 1:
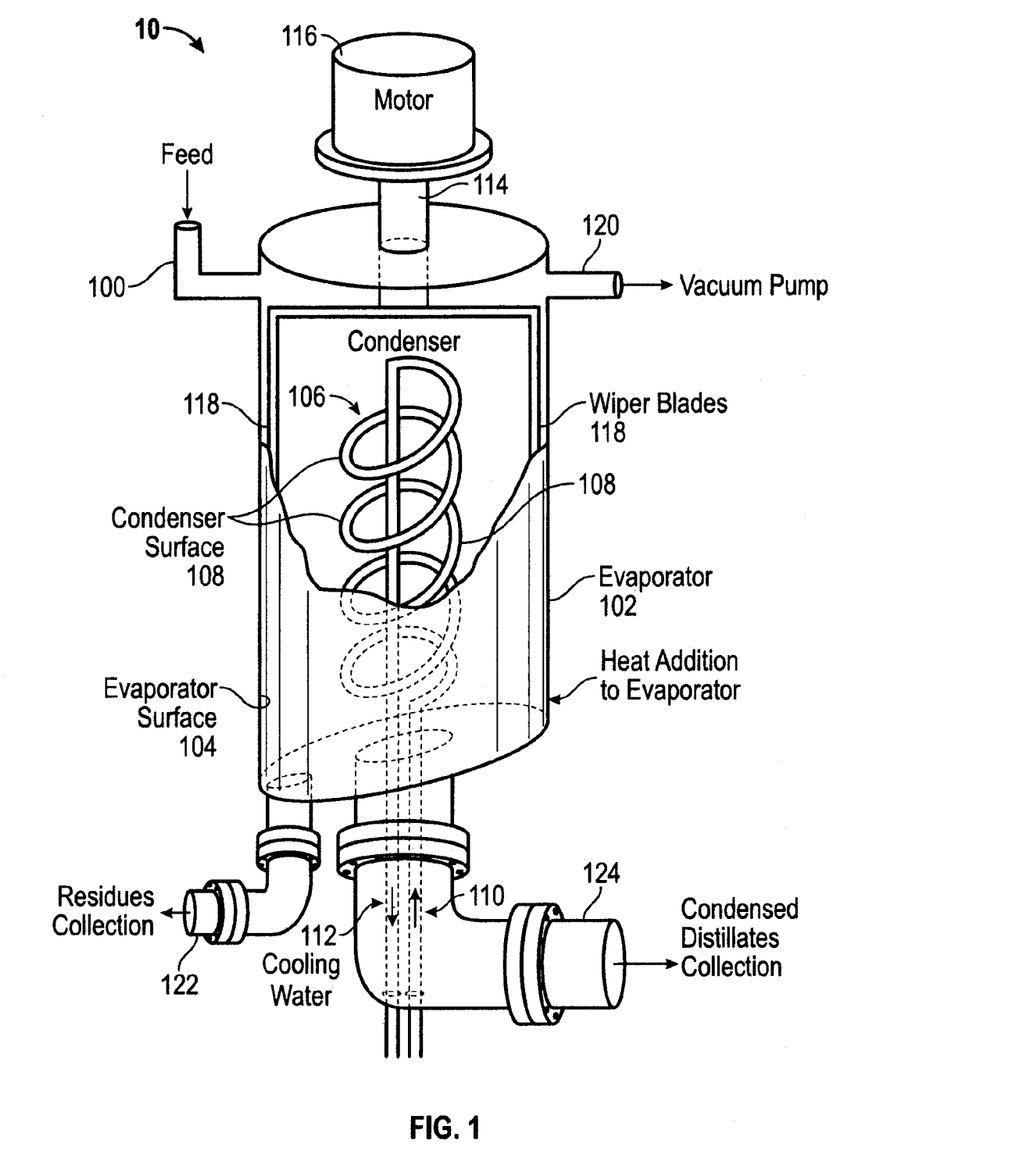
FIG. 1 is a simplified schematic illustration of a molecular distillation apparatus.

Referring now to FIG. 1, therein is provided a simplified schematic illustration of a molecular distillation apparatus 10 useful in distilling bio-oil or fractions of bio-oil.

Molecular distillation apparatus 10 includes a feed conduit 100; an evaporator 102 connected in fluid flow communication with feed conduit 100 and having an evaporator surface 104; a condenser 106, positioned within evaporator 102, and having a condenser surface 108, a cooling fluid inlet 110 extending through the base of evaporator 102, and a cooling fluid outlet 112 extending through the base of evaporator 102; a rotor 114; a motor 116 engaged to rotor 114; wiper blades 118 connected to rotor 114; a vacuum pump conduit 120 connected in fluid flow communication with evaporator 102; a residue conduit 122 connected in fluid flow communication with evaporator 102; and a condensed distillate conduit 124 connected in fluid flow communication with evaporator 102, positioned to receive condensed distillates from condenser surface 108, and in sealing relation with cooling fluid inlet 110 and cooling fluid outlet 112 which extend through condensed distillate conduit 124.

A vacuum is created in evaporator 102 via a vacuum drawn through vacuum pump conduit 120, and heat is added to evaporator 102. A molecular distillation feed is charged to molecular distillation apparatus 10 via conduit 100 and passes to the space between evaporator surface 104 and wiper blades 118. Motor 116 rotates rotor 114 and wiper blades 118 such that the molecular distillation feed is maintained as a thin layer on evaporator surface 104. Cold fluid is charged to condenser 106 via cooling fluid inlet 110, thereby cooling condenser surface 108, and return fluid having an elevated temperature as compared to the cold fluid is removed from condenser 106 via cooling fluid outlet 112. At least a portion of the molecular distillation feed evaporates from evaporator surface 104 and condenses on condenser surface 108 forming a condensed distillate fraction of the molecular distillation feed which flows down condenser surface 108 and is removed via condensed distillate conduit 124. Non-evaporated molecular distillation feed (residue) is removed from evaporator 102 via residue conduit 122. Optionally, at least a portion of the residue can be recycled as feed to molecular distillation apparatus 10 via feed conduit 100.

The molecular distillation apparatus can also comprise at least a first stage and a second stage, wherein each stage separately comprises the components as described above and depicted in FIG. 1. Also, fractionation of the feed by molecular distillation as described above in steps i)-v) can be conducted in the first stage, and the fractionation of the collected bio-oil liquid residue by molecular distillation as described above in steps vi)-x) can be conducted in the second stage.

The collected second pass bio-oil liquid residue can be fractionated by molecular distillation by a method comprising:

xi) allowing the collected second pass bio-oil liquid residue to form into a thin layer onto an evaporating surface;

xii) evaporating a portion of the collected second pass bio-oil liquid residue to thereby form a third pass bio-oil vapor fraction and a third pass bio-oil liquid residue;

xiii) condensing at least a portion of the third pass bio-oil vapor fraction at a location in close proximity to the location of the evaporation in step xii) to thereby form a third pass bio-oil distillated fraction;

xiv) collecting the third pass bio-oil distillated fraction; and xv) collecting the third pass bio-oil liquid residue, thereby forming a collected third pass bio-oil liquid residue.

The evaporation of the collected second pass bio-oil liquid residue can be conducted at a temperature in the range of from about 60° C. to about 250° C., or from about 70 to about 200° C. The condensation of the third pass bio-oil vapor fraction is conducted at a temperature below about 20° C., or below about 10° C., or below about 4° C.

The fractionation of the collected second pass bio-oil liquid residue by molecular distillation can be conducted at a pressure below about 50 torr, or below about 10 torr.

The third pass bio-oil distillated fraction has a boiling point range of from about 150° C. to about 420° C., or from about 180° C. to about 400° C.; an oxygenate compounds/hydrocarbons wt. ratio below about 7 and/or at least about 2, or below about 6 and/or at least about 3; a density below about 1.11, and a TAN below about 5.

Preferably, the collected third pass bio-oil liquid residue is fluid at temperatures above 50° C. and at pressures less than or equal to atmospheric pressure.

The fractionation by molecular distillation of the collected second pass bio-oil liquid residue in steps xi)-xv) can also be separately performed in the molecular distillation apparatus as described above.

The molecular distillation apparatus can also comprise at least a first stage, a second stage, and a third stage wherein each stage separately comprises the components as described above and depicted in FIG. 1. The fractionation of the feed by molecular distillation as described above in steps i)-v) can be conducted in the first stage, the fractionation of the collected bio-oil liquid residue by molecular distillation as described above in steps vi)-x) can be conducted in the second stage, and the fractionation of the collected second pass bio-oil liquid residue by molecular distillation in steps xi)-xv) can be conducted in the third stage.

EXAMPLES

Four different samples of bio-oils, each separately produced from the thermo-catalytic conversion of southern yellow pine wood chips, were subjected to molecular distillations carried out using Short Path Evaporators (SPE's) at two different scales (bench top scale SPE and pilot plant scale SPE). Each of the SPE's included a feed tank, evaporator, rotor, condenser, cold-trap, vacuum system, and heating and cooling baths. The evaporator was heated using heating oil from the heating bath, and the condenser was cooled using the chilled water from the cooling bath. The vacuum for the system was controlled by an aeration valve used to add pressurized nitrogen. The cold trap served to protect the vacuum system from volatiles escaping the evaporation and condensation sections.

Certain properties of the Bio-Oil feeds are provided in Table 1 below.

TABLE 1

| Bio-Oil Sample | A | B | C | D |
|---|---|---|---|---|
| Density | 1.13 | 1.07 | 1.06 | 1.06 |
| [Water], wt % | 9.55 | 2.54 | 4.73 | 24.0 |
| TAN, mg KOH/g | 37.3 | 4.70 | 4.8 | 12.1 |
| O, wt % | 19.6 | 10.09 | 10.3 | 14.8 |

RUN 1

Figure 2:
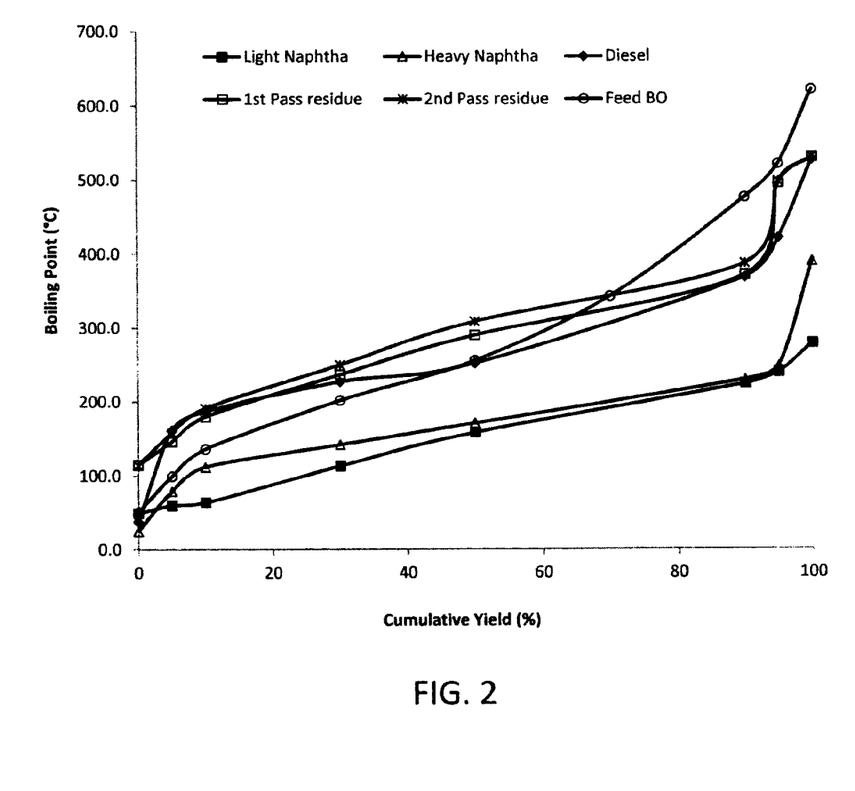
FIG. 2 is a plot of simulated distillations for: a feed bio-oil, and condensate and residue fractions obtained from the feed bio-oil after multi-pass molecular distillation.

A sample of Bio-Oil A was subjected to molecular distillation in a bench scale SPE unit in RUN 1. The conditions used for RUN 1 are presented in Table 2. Bio-Oil A, and the various fractions separated therefrom as a result of the molecular distillation, were subjected to simulated distillation in a gas chromatograph. The plots for the simulated distillations for RUN 1 are presented in FIG. 2.

TABLE 2

|  | RUN 1 | | |
| --- | --- | --- | --- |
| Distillation Parameters | 1st Pass | 2nd Pass | 3rd Pass |
| Evaporator Temp., °C. | 50 | 100 | 160 |
| Condenser Temp., °C. | 10 | 10 | 10 |
| Pressure, torr | 305-313 | 200 | 0.6 |
| Wiper Speed (RPM) | 315 | 315 | 315 |

RUN 2

Figure 3:
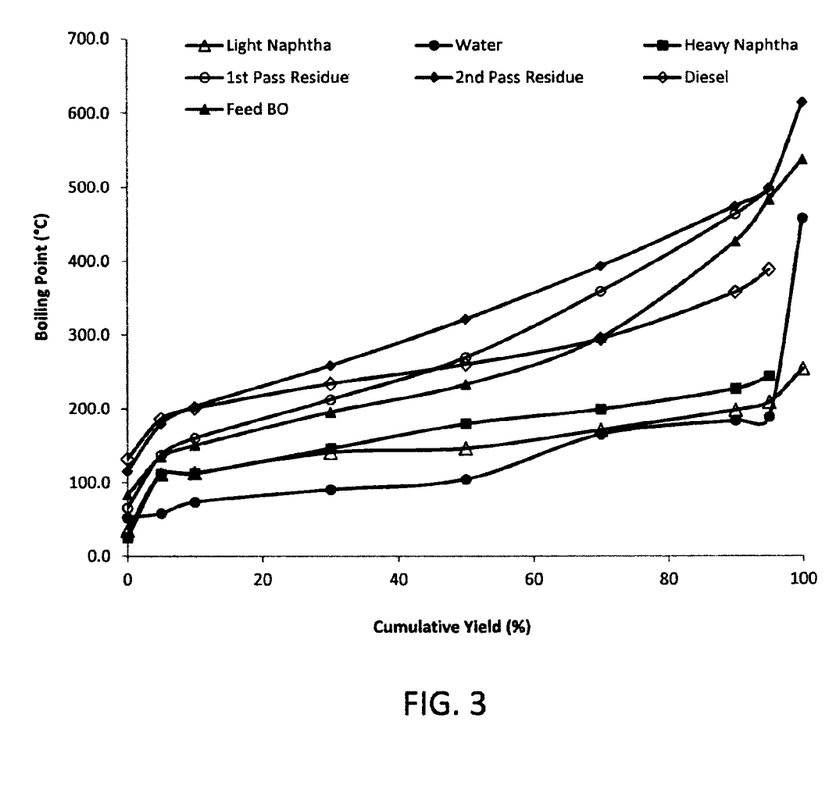
FIG. 3 is a plot of simulated distillations for: a feed bio-oil, and condensate and residue fractions obtained from the feed bio-oil after multi-pass molecular distillation.

A sample of Bio-Oil B was subjected to molecular distillation in a bench scale SPE unit in RUN 2. The conditions used for RUN 2 are the same as those used for RUN 1, presented above in Table 2. Bio-Oil B, and the various fractions separated therefrom as a result of the molecular distillation, were subjected to simulated distillation in a gas chromatograph. The plots for the simulated distillations for RUN 2 are presented in FIG. 3.

The yield results for RUNS 1 and 2 are presented in Table 3 below.

TABLE 3

|  | RUN 1 (Bio-Oil A) | RUN 2 (Bio-Oil B) |
| --- | --- | --- |
| Light Naphtha | 5.39 | 4.85 |
| Heavy Naphtha | 18.02 | 25.18 |
| Full Range Naphtha | 23.41 | 30.03 |
| Diesel | 8.18 | 32.55 |
| Water | 0.41 | 1.75 |
| Residue and Losses | 44.59 | 5.64 |

Although the residue and losses for Bio-Oil A in Run 1 are high as compared to those for Bio-Oil B in Run 2, Run 1 does demonstrate that relatively low quality bio-oils, like Bio-Oil A, can be effectively fractionated into useful fuel-range fractions through use of molecular distillation. This is significant given that the inventors have found that such lower quality bio-oils cannot be effectively fractionated into useful fuel-range fractions in any other way.

RUNS 3-6

Figure 4:
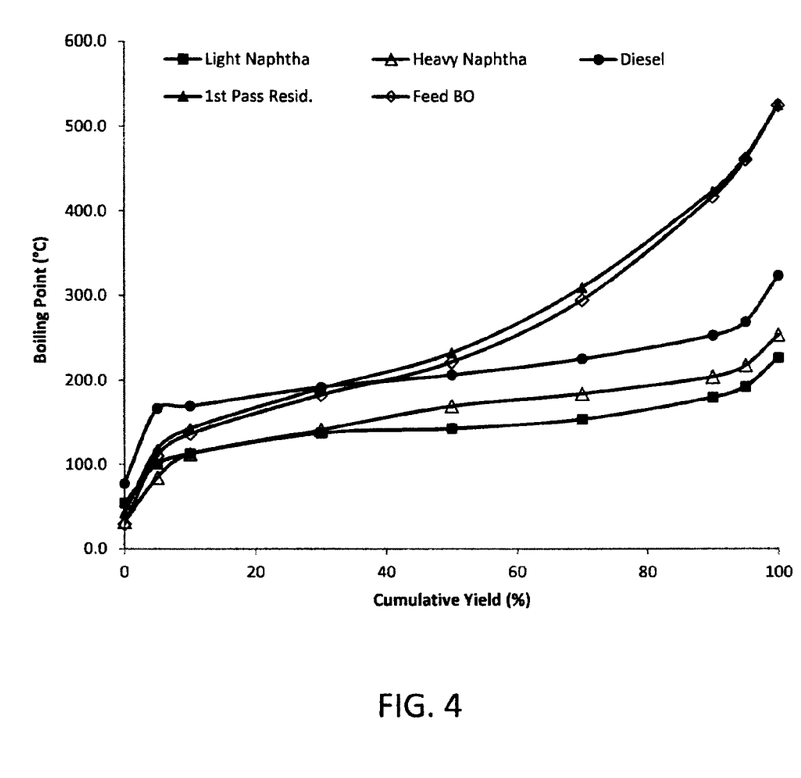
FIG. 4 is a plot of simulated distillations for: a feed bio-oil, and condensate and residue fractions obtained from the feed bio-oil after multi-pass molecular distillation.
Figure 5:
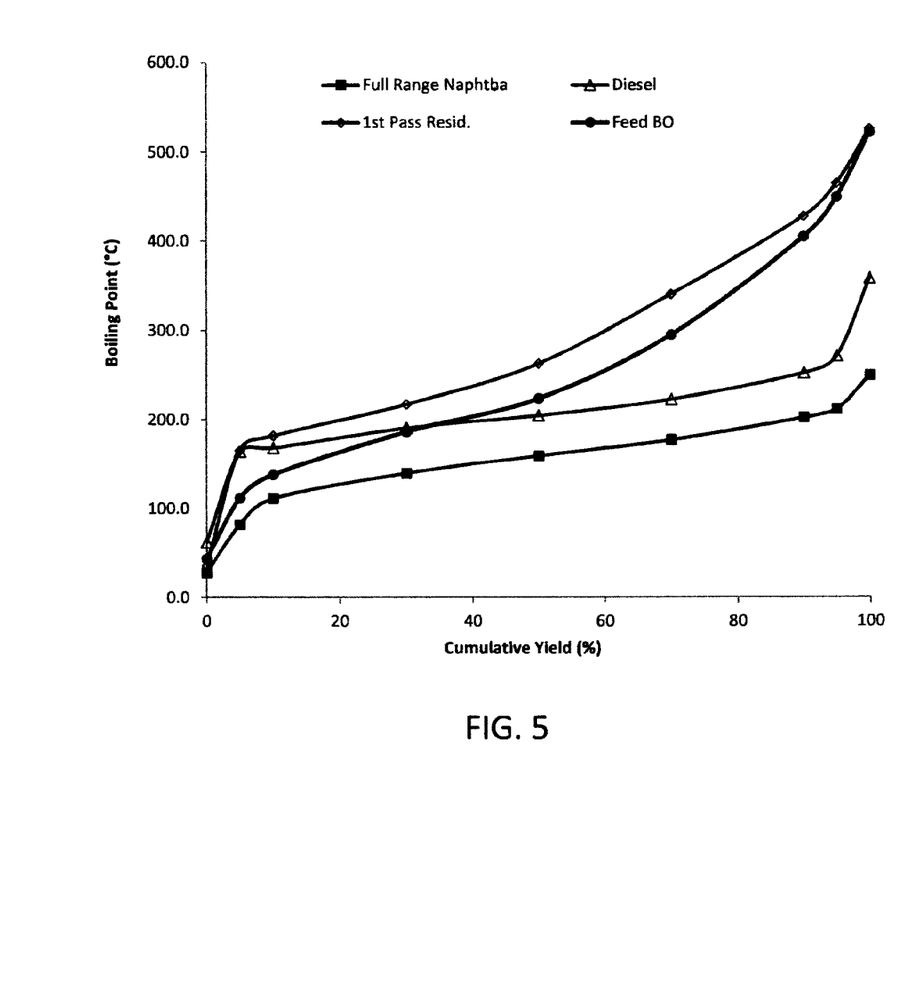
FIG. 5 is a plot of simulated distillations for: a feed bio-oil, and condensate and residue fractions obtained from the feed bio-oil after multi-pass molecular distillation.

Samples of Bio-Oil C were subjected to molecular distillation in bench scale SPE units in RUNS 3 through 6. The conditions used are presented in Table 4 below. Bio-Oil C, and the various fractions separated therefrom in each of RUNS 5 and 6 as a result of the molecular distillations, were subjected to simulated distillation in a gas chromatograph. The plots for the simulated distillations for RUNS 5 and 6 are presented in FIGS. 4 and 5, respectively.

TABLE 4

|  | Pass | RUN 3 | RUN 4 | RUN 5 | RUN 6 |
| --- | --- | --- | --- | --- | --- |
| Evaporator Temp., °C. | 1st | 50 | 30 | 31 | 70 |
|  | 2nd | 100 | 70 | 70 | 100 |
|  | 3rd | 150 | 120 | 100 | — |
| Condenser Temp., °C. | 1st | 3 | 3 | 3 | 3 |
|  | 2nd | 10 | 3 | 3 | 3 |
|  | 3rd | 10 | 10 | 3 | — |
| Pressure, torr | 1st | 128 | 50 | 75 | 51 |
|  | 2nd | 75 | 40 | 50 | 10 |
|  | 3rd | 1.5-3.5 | 3 | 10 | — |
| Feed Rate (ml/min) | 1st | 2.92 | 1-3.3 | 3 | 3.25 |
|  | 2nd | 3.17 | 1.5 | 2 | 5 |
|  | 3rd | — | 1-1.5 | 7 | — |
| Wiper Speed (RPM) | 1st | 200 | 200 | 530 | 500 |
|  | 2nd | 200 | 200 | 540 | 519 |
|  | 3rd | 200 | 250 | 540 | — |

The yield results for RUNS 3 through 6 are presented in Table 5 below.

TABLE 5

|  | RUN 3 | RUN 4 | RUN 5 | RUN 6 |
| --- | --- | --- | --- | --- |
| Light Naphtha | 14.81 | 5.18 | 8.5 | N/A |
| Light Naphtha Density, g/ml | Not measured | Not measured | 0.891 | N/A |
| Heavy Naphtha | 22.07 | 4.09 | 18.7 | N/A |
| Full Range Naphtha | 36.88 | 9.27 | 27.2 | 26.65 |
| Full Range Naphtha Density, g/ml | Not measured | Not measured | Not measured | 0.9308 |
| Diesel | 24.20 | 30.38 | 22.1 | 20.31 |
| Residue | 18.03 | 23.18 | 42.3 | 44.28 |
| Water | Not measured | 2.64 | Not measured | Not measured |
| Total | 79.11 | 65.47 | 91.6 | 94.04 |
| Losses | 20.89 | 34.53 | 8.4 | 5.96 |

RUN 7

Figure 6:
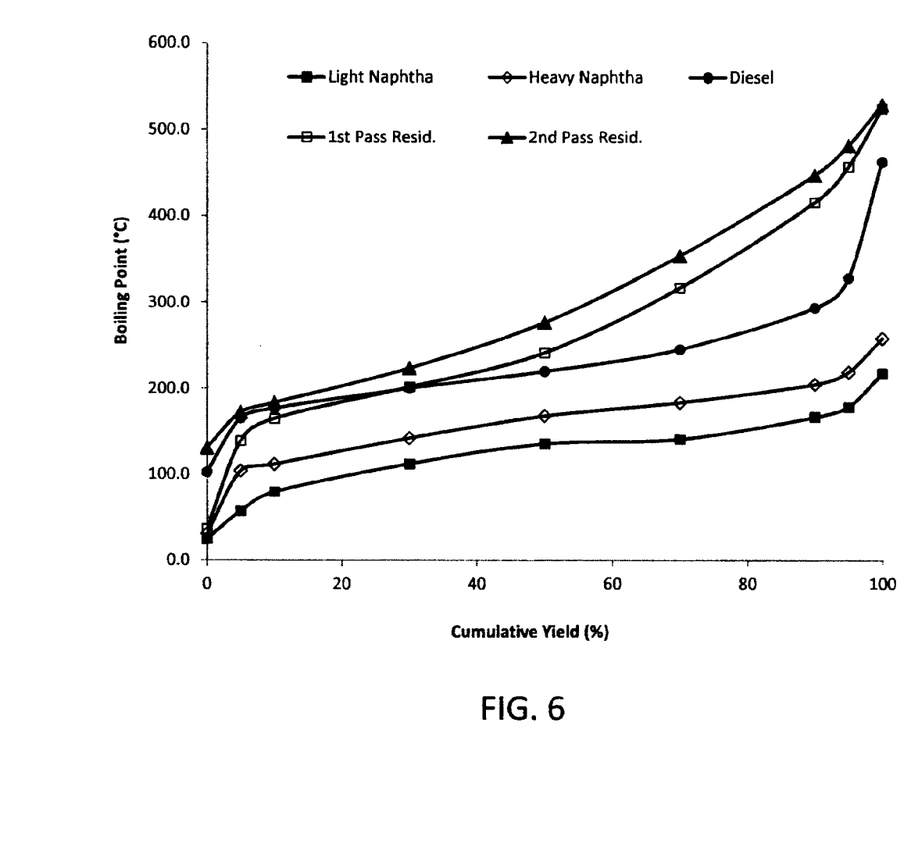
FIG. 6 is a plot of simulated distillations for: a feed bio-oil, and condensate and residue fractions obtained from the feed bio-oil after multi-pass molecular distillation.

A sample of Bio-Oil C was subjected to molecular distillation in a pilot plant scale SPE unit in RUN 7. The conditions used for RUN 7 are presented in Table 6. Bio-Oil C, and the various fractions separated therefrom as a result of the molecular distillation, were subjected to simulated distillation in a gas chromatograph. The plots for the simulated distillations for RUN 7 are presented in FIG. 6, and the yield results for RUN 7 are presented in Table 7 below.

TABLE 6

| Distillation Parameters | 1st Pass | 2nd Pass | 3rd Pass |
| --- | --- | --- | --- |
| Evaporator Temp., °C. | 75 | 100 | 120 |
| Condenser Temp., °C. | 0 | 0 | 0 |
| Pressure, torr | 56-60 | 11 | 1.2-2.7 |
| Wiper Speed (RPM) | 400 | 400 | 400 |

TABLE 7

| Light Naphtha | 8.4 |
| --- | --- |
| Light Naphtha Density, g/ml | 0.862 |
| Heavy Naphtha | 12 |
| Heavy Naphtha Density, g/ml | 0.943 |
| Diesel | 30.5 |
| Water | 3 |
| Residue | 30.3 |
| Total | 92 |
| Losses | 8 |

Runs 1-7 demonstrate that bio-oils produced in the manner described above can be effectively fractionated into useful fuel-range fractions through use of molecular distillation. The boiling ranges were found to be controllable by adjustments to the evaporation temperature and the vacuum pressure.

RUNS 8-13

Samples of Bio-Oil D were subjected to one-pass molecular distillations in a pilot plant scale SPE unit in RUN 8-13. The conditions used for RUNs 8-13 are presented in Table 8. The densities for the light bio-naphthas obtained from the molecular distillations in RUNS 8-13 are also presented in Table 8.

TABLE 8

| Distillation Parameters | RUN 8 | RUN 9 | RUN 10 | RUN 11 | RUN 12 | RUN 13 |
|---|---|---|---|---|---|---|
| Evaporator Temp., ° C. | 70 | 80 | 80 | 80 | 90 | 90 |
| Condenser Temp., ° C. | 4 | 4 | 4 | 4 | 4 | 4 |
| Pressure, torr | 80 | 80 | 80 | 80 | 80 | 40 |
| Wiper Speed (RPM) | 400 | 400 | 400 | 400 | 400 | 400 |
| Light Naphtha Density, g/ml | 0.8607 | 0.8629 | 0.8679 | 0.862 | 0.864 | 0.8625 |

Runs 8-13 demonstrate that a light naphtha having a density below 0.89 g/ml can be achieved through molecular distillation of a bio-oil feed produced in the manner described above.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

Further, unless expressly stated otherwise, the term "about" as used herein is intended to include and take into account variations due to manufacturing tolerances and/or variabilities in process control.

Changes may be made in the construction and the operation of the various components, elements and assemblies described herein, and changes may be made in the steps or sequence of steps of the methods described herein without departing from the spirit and the scope of the invention as defined in the following claims.

What is claimed is:

1. A method for producing a bio-oil distillated fraction comprising:
   a) converting biomass in a conversion reactor to thereby produce a conversion reactor effluent comprising vapor conversion products, wherein said conversion reactor contains a catalyst and is operated at a temperature in the range of from about 200° C. to about 1000° C.;
   b) condensing at least a portion of said vapor conversion products to form a condensate comprising bio-oil and water;
   c) separating said condensate by gravity separation into a bio-oil stream comprising said bio-oil and less than about 10 wt % water, and into an aqueous phase comprising water and less than about 25 wt % hydrocarbonaceous compounds;
   d) fractionating a feed comprising said bio-oil stream by molecular distillation to form a bio-oil distillated fraction comprising water and a light bio-naphtha, wherein the feed is not subjected to a vacuum distillation step; and
   e) separating said bio-oil distillated fraction to form an aqueous distillate fraction comprising said water and to form said light bio-naphtha having a density less than about 0.9, a TAN less than about 4, and comprising less than 1 wt % water.

2. The method of claim 1 wherein said conversion reactor is operated in the substantial absence of oxygen and at a temperature between about 250° C. and about 800° C., and wherein said biomass is a lignocellulosic biomass material.

3. The method of claim 1 wherein said bio-oil stream has a total oxygen content of less than about 20 wt %; comprises at least about 10 wt % hydrocarbons, has a Total Acid Number of less than about 50 mg KOH/g, has a Conradson Carbon Residue of less than about 30 wt %, and contains less than or equal to about 10 wt % carbonyl compounds.

4. The method of claim 1 wherein said fractionating of said feed by molecular distillation in step e d comprises:
   i) allowing said feed to form into a thin layer onto an evaporating surface;
   ii) evaporating a portion of said feed to thereby form a bio-oil vapor fraction and a bio-oil liquid residue;
   iii) condensing at least a portion of said bio-oil vapor fraction at a location in close proximity to the location of said evaporation in step ii) to thereby form said bio-oil distillated fraction;
   iv) collecting said bio-oil distillated fraction; and
   v) collecting said bio-oil liquid residue, thereby forming a collected bio-oil liquid residue.

5. The method of claim 4 wherein said evaporation is conducted at a temperature in the range of from about 20° C. to about 120° C.

6. The method of claim 4 wherein said evaporation is conducted at a temperature in the range of from about 30 to about 100° C.

7. The method of claim 4 wherein said condensation is conducted at a temperature below about 15° C.

8. The method of claim 4 wherein said fractionation by molecular distillation is conducted at a pressure below about 200 torr.

9. The method of claim 4 wherein said fractionation by molecular distillation is conducted at a pressure below about 100 torr.

10. The method of claim 4 wherein said fractionating of said feed by molecular distillation is conducted in a molecular distillation apparatus comprising an evaporator having an evaporator surface and a condenser having a condenser surface, wherein said condenser surface is positioned a short distance from said evaporator surface; wherein said feed is introduced to said molecular distillation apparatus for contact with said evaporator surface, wherein said feed is maintained as a thin layer on said evaporator surface, and wherein said bio-oil vapor fraction is condensed on said condenser surface.

11. The method of claim 1 wherein said bio-oil distillated fraction comprises less than about 50 wt % water.

12. The method of claim 1 wherein said light bio-naphtha has a boiling point range of from about 25° C. to about 220° C. and an oxygenate compounds/hydrocarbons wt. ratio below about 2 and at least about 0.01.

13. The method of claim 1 wherein said light bio-naphtha has a boiling point range of from about 30° C. to about 190° C. and an oxygenate compounds/hydrocarbons wt. ratio below about 1 and at least about 0.05.

14. The method of claim 4 wherein at least a portion of said collected bio-oil liquid residue is recycled to become a part of said feed in a continuous process.

15. The method of claim 4 further comprising fractionating said collected bio-oil liquid residue by molecular distillation by a method comprising:
   vi) allowing said collected bio-oil liquid residue to form into a thin layer onto an evaporating surface;

vii) evaporating a portion of said collected bio-oil liquid residue to thereby form a second pass bio-oil vapor fraction and a second pass bio-oil liquid residue;

viii) condensing at least a portion of said second pass bio-oil vapor fraction at a location in close proximity to the location of said evaporation in step vii) to thereby form a second pass bio-oil distillated fraction;

ix) collecting said second pass bio-oil distillated fraction; and x) collecting said second pass bio-oil liquid residue, thereby forming a collected second pass bio-oil liquid residue.

16. The method of claim 15 wherein said evaporation is conducted at a temperature in the range of from about 50° C. to about 200° C.

17. The method of claim 15 wherein said evaporation is conducted at a temperature in the range of from about 60° C. to about 150° C.

18. The method of claim 15 wherein said condensation is conducted at a temperature below about 15° C.

19. The method of claim 15 wherein said fractionation by molecular distillation is conducted at a pressure below about 100 torr.

20. The method of claim 15 wherein said fractionation by molecular distillation is conducted at a pressure below about 80 torr.

21. The method of claim 15 wherein said second pass bio-oil distillated fraction has a boiling point range of from about 30° C. to about 250° C., an oxygenate compounds/hydrocarbons ratio below about 3, a density below about 0.96, and a TAN below about 7 and at least about 0.2.

22. The method of claim 15 wherein said second pass bio-oil distillated fraction has a boiling point range of from about 40° C. to about 230° C. and an oxygenate compounds/hydrocarbons ratio below about 2 and at least about 0.4.

23. The method of claim 15 wherein said fractionations by molecular distillation of: A) said feed in steps i)-v) and B) said collected bio-oil liquid residue in steps vi)-x), are each separately performed in a molecular distillation apparatus comprising an evaporator having an evaporator surface; a condenser having a condenser surface, wherein said condenser surface is positioned a short distance from said evaporator surface; a rotor; and wiper blades connected to said rotor, wherein said wiper blades are positioned between said evaporator surface and said condenser surface and are in close proximity to said evaporator surface.

24. The method of claim 15 wherein a molecular distillation apparatus comprising at least a first stage and a second stage is utilized, wherein each stage comprises an evaporator having an evaporator surface; a condenser having a condenser surface, wherein said condenser surface is positioned a short distance from said evaporator surface; a rotor; and wiper blades connected to said rotor, wherein said wiper blades are positioned between said evaporator surface and said condenser surface and are in close proximity to said evaporator surface; and wherein said fractionation of said feed by molecular distillation in steps i)-v) is conducted in said first stage, and said fractionation of said collected bio-oil liquid residue by molecular distillation in steps vi)-x) is conducted in said second stage.

25. The method of claim 15 further comprising fractionating said collected second pass bio-oil liquid residue by molecular distillation by a method comprising:

xi) allowing said collected second pass bio-oil liquid residue to form into a thin layer onto an evaporating surface;

xii) evaporating a portion of said collected second pass bio-oil liquid residue to thereby form a third pass bio-oil vapor fraction and a third pass bio-oil liquid residue;

xiii) condensing at least a portion of said third pass bio-oil vapor fraction at a location in close proximity to the location of said evaporation in step xii) to thereby form a third pass bio-oil distillated fraction;

xiv) collecting said third pass bio-oil distillated fraction; and xv) collecting said third pass bio-oil liquid residue, thereby forming a collected third pass bio-oil liquid residue.

26. The method of claim 25 wherein said evaporation is conducted at a temperature in the range of from about 60° C. to about 250° C.

27. The method of claim 25 wherein said evaporation is conducted at a temperature in the range of from about 70 to about 200° C.

28. The method of claim 25 wherein said condensation is conducted at a temperature below about 15° C.

29. The method of claim 25 wherein said fractionation by molecular distillation is conducted at a pressure below about 50 torr.

30. The method of claim 25 wherein said fractionation by molecular distillation is conducted at a pressure below about 10 torr.

31. The method of claim 25 wherein said third pass bio-oil distillated fraction has a boiling point range of from about 150° C. to about 420° C., an oxygenate compounds/hydrocarbons wt. ratio below about 7 and at least about 2, a density below about 1.1, and a TAN below about 3.5.

32. The method of claim 25 wherein said third pass bio-oil distillate fraction has a boiling point range of from about 180° C. to about 400° C. and an oxygenate compounds/hydrocarbons wt. ratio below about 6 and at least about 3.

33. The method of claim 25 wherein said collected third pass bio-oil liquid residue is fluid at temperatures above 50° C. and at pressures less than or equal to atmospheric pressure.

34. The method of claim 25 wherein said fractionations by molecular distillation of: A) said feed in steps i)-v), B) said collected bio-oil liquid residue in steps vi)-x), and C) said collected second pass bio-oil liquid residue in steps xi)-xv) are each separately performed in a molecular distillation apparatus comprising an evaporator having an evaporator surface; a condenser having a condenser surface, wherein said condenser surface is positioned a short distance from said evaporator surface; a rotor; and wiper blades connected to said rotor, wherein said wiper blades are positioned between said evaporator surface and said condenser surface and are in close proximity to said evaporator surface.

35. The method of claim 25 wherein a molecular distillation apparatus comprising at least a first stage, a second stage, and a third stage is utilized, wherein each stage comprises an evaporator having an evaporator surface; a condenser having a condenser surface, wherein said condenser surface is positioned a short distance from said evaporator surface; a rotor; and wiper blades connected to said rotor, wherein said wiper blades are positioned between said evaporator surface and said condenser surface and are in close proximity to said evaporator surface; and wherein said fractionation of said feed by molecular distillation in steps i)-v) is conducted in said first stage, said fractionation of said collected bio-oil liquid residue by molecular distillation in steps vi)-x) is conducted in said second stage, and said fractionation of said collected second pass bio-oil liquid residue by molecular distillation in steps xi)-xv) is conducted in said third stage.

* * * * *

UNITED STATES PATENT AND TRADEMARK OFFICE
CERTIFICATE OF CORRECTION

PATENT NO. : 9,327,208 B2
APPLICATION NO. : 13/459887
DATED : May 3, 2016
INVENTOR(S) : Maria Magdalena Ramirez Corredores et al.

It is certified that error appears in the above-identified patent and that said Letters Patent is hereby corrected as shown below:

In the Claims:
Column 10, line 13: After "step" delete "e".

Signed and Sealed this
Fifth Day of July, 2016

Michelle K. Lee
*Director of the United States Patent and Trademark Office*